3,129,074
MOTOR FUEL
Jack F. Bussert, Munster, Ind., and Fred K. Kawahara, Park Forest, Ill., assignors to Standard Oil Company, Chicago, Ill., a corporation of Indiana
No Drawing. Filed July 31, 1961, Ser. No. 127,896
5 Claims. (Cl. 44—69)

This invention relates to improved addition agents useable for reduction of spark plug fouling and octane requirement increase and in the suppression of surface ignition of leaded gasolines in the operation of internal combustion engines. More particularly, the invention provides a motor fuel or additive mixture for incorporation in a motor fuel which is effective in bringing about the above referred to benefits without adversely affecting the anti-knock properties of the lead compound present in the leaded fuel.

Current emphasis on high compression ratios and other high performance design features in gasoline inventions of the spark ignition internal combustion type has not only tended to raise octane requirements, but has also created a situation where spark plug fouling and "knock-like" noises from surface ignition, often referred to as pre-ignition, have become a limiting factor in engine design and operation. The knock-like detonation induced by pre-ignition appears to be a result of the use of tetraethyl lead as the anti-knock agent in fuels of high performance value. Pre-ignition occurs when some portion of the fuel-air charge in an engine cylinder is ignited by a hot surface before inflammation would have occurred in that part of the charge as a result of spark ignition. Pre-ignition may be initiated by any source of heat which prematurely ignites the charge or a portion thereof.

The type of pre-ignition which is most common is deposit-induced pre-ignition, which is caused by glowing particles of combustion chamber deposit. Lead salts and salts of other metals catalyze the oxidation of the carbonaceous residues from fuel and oil, and initiate the glowing of the particles at lower temperatures than would be the case if the metallic salts were not present. The glowing particles of deposit may then cause pre-ignition by igniting the charge prematurely.

The pre-ignition problem is becoming worse as a result of a combination of factors. The horsepower developed per unit of engine displacement has increased markedly during the last five years. The increases have been produced by raising compression ratios, by improving volumetric efficiencies, and by reducing engine friction. However, the power required to propel a car at a given speed on a level road is no greater than before. Thus, a smaller fraction of the potential horsepower is used to drive a car at low speed. The growing congestion of traffic in metropolitan areas makes the pre-ignition problem worse because it causes a great deal of idling and low-speed driving. Idling operation involves rich fuel-air ratios and incomplete combustion, resulting in the formation of resinous binders and of soot, particularly from the higher-boiling fractions of the fuel. Quantities of oil reach the combustion chamber as a result of operation at high values of inlet-manifold vacuum, and oil-decomposition products further contribute to the deposits. The net result is that deposits are formed which may cause pre-ignition when they are heated during acceleration or operation at high speeds.

It is well known that the addition of phosphorus in the form of phosphates, including thiophosphates, or phosphonates to leaded fuel results in reducing spark plug fouling and some extent reduces surface ignition and/or octane requirement increase. However, such compounds often have two serious drawbacks. First, the phosphorus containing additives often adversely affect the anti-knock properties of a lead containing anti-knock agent such as tetraethyl lead. Additionally, and as a second deficiency, such phosphorus compounds tend to be thermally unsuitable under the higher temperature operating conditions of spark ignition internal combustion engines.

It is an object of this inventoin to provide a motor fuel for internal combustion engines which will, in addition to suppressing surface ignition and even reducing spark plug fouling and/or octane requirement increase, not adversely affect the anti-knock properties of organo lead compounds and particularly tetraethyl lead. It is a further object of this invention to provide a fuel containing addition agents capable of imparting the above attributes and thermally stable under spark ignition internal combustion engine operating conditions. Further objections will be apparent to those skilled in the art as the description of this invention proceeds.

We have discovered certain new and useful addition agents of the type capable of reducing surface ignition and other undesirable effects without adversely affecting the leaded anti-knock properties of a motor fuel. Accordingly, we have provided a motor fuel for spark ignition internal combustion engines containing a minor amount of tetraethyl lead, in the range of from about 0.5 to about 5.0 ml. of tetraethyl lead per gallon of fuel, and in combination therewith, a dithiophosphorus-pentaerythritol-olefinic compound reaction product in an amount sufficient to provide a mol ratio of phosphorus to lead of from about 0.001 to about 1.0, and preferably from about 0.01 to about 0.3 mol ratio of phosphorus to lead, which reaction product has the general formula:

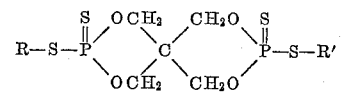

wherein R and R' are each the same or different radical having from 2 to 35 carbon atoms and selected from the class consisting of hydrocarbon radicals and oxygen-containing hydrocarbon radicals. The size and configuration of R and R' are not critical; the purpose of R and R' is to provide oil solubility and to tie up one sulfur atom of the thiophosphate group.

The motor fuels will preferably be gasoline but may be any other combustible liquid of suitable volatility commonly employed as fuel for internal combustion-spark ignition engines, including paraffinic, naphthenic and aromatic hydrocarbons, isooctane and mixtures of isooctane with other suitable liquid hydrocarbons. The boiling point of such fuels should be in the range of from about 100° F. to about 500° F. and preferably in the range of from about 150° F. to about 400° F. Such motor fuels may also contain anti-oxidants, stabilizers, dyes, anti-icing agents, lead scavenging agents and/or other compounds which are commonly employed in leaded motor fuels.

The combustion mixture can contain tetraethyl lead equivalent to a concentration of from about 0.5 ml. to about 5 ml. or more per gallon of the hydrocarbon motor fuel employed. The concentration of tetraethyl lead may be varied as is usual with the engine and its use.

We can also provide in accordance with our invention, an additive mixture which comprises essentially tetraethyl lead and the above described dithiophosphate in an amount sufficient to give a mol ratio of phosphorus to lead as defined as above. The additive mixture may also contain a solvent oil, such as a refined hydrocarbon oil, and also desirable amounts of halo-hydrocarbon lead scavenging agents, dyes and the like. Enough solvent oil can be employed to obtain desirable fluidity. For example, the solvent oil can be employed in an amount up to about 95% or more based on the total weight of mixture.

In general, the dithiophosphorus compounds described herein may be prepared by reacting phosphorus pentasulfide with pentaerythritol in an equal molar ratio. The reaction may be carried out in the presence of a solvent for the pentaerythritol at a temperature in the range of from about 50 to about 250° C. or higher with agitating until dissolution of solids and formation of a clear yellow solution. Thereafter, an olefinic unsaturated compound corresponding to the desired R and R' groups of the above formula is added in an equal molar amount, and the reaction is continued for a period sufficient to complete the addition of the olefinic double bond at the sulfur of the SH portion of the $P_2S_5$-pentaerythritol reaction product. An organic layer containing the desired product is recovered and may be purified as desired using usual solvent techniques.

The following are illustrative of olefinically unsaturated hydrocarbons and olefinically unsaturated oxygen-containing hydrocarbons which may be used in the preparation of thiophosphorus addition agents of this invention: unsaturated hydrocarbons such as propylene, styrene, diisobutylene, dicyclopentadiene, cyclohexene, vinyl naphthalene, isobutylene, ethylene, α- and β-amylenes, 2,3-dimethyl-2-butene, isoprene, diisoamylene, methene, triisoamylene, butadiene, d-limonene, divinyl benzene, divinyl naphthalene, vinyl anthracene, α-methyl styrene, 3-methyl styrene, 3,4,5-trimethyl styrene, cyclobutene, vinyl phenanthrene, pinene, dipentene, indene, etc.; unsaturated carboxylic acids such as acrylic acid, methacrylic acid, fumaric acid, maleic acid, cyclohexenoic acid, cyclopentenoic acid, oleic acid, linoleic acid, crotonic acid, linolenic acid, vinylacetic acid, dilinoleic acid, heptadecenic acid, etc.; unsaturated alcohols such as alkyl alcohol octenol, butenol, dodecenol, 12-hydroxy octadecene, etc.; unsaturated esters such as esters of the above alcohols with the above acids, methyl methacrylate, vinyl acetate, vinyl butyrate, vinyl decanoate, vinyl octadecanoate, vinyl benzoate; vinyl toluate, butyl acrylate, butyl methacrylate, octyl acrylate, octyl methanylate, octadecyl acrylate, octadecyl methacrylate, dibutyl fumarate, di-isooctyl fumarate, dioctadecyl fumarate, diethyl maleate, phenyl citraconate, dicyclohexanyl mesaconate, octadecyl vinylacetate, myricyl oleate, etc.; unsaturated aldehydes and ketones such as acrolein, crotonaldehyde, tiglaldehyde, methyl vinyl ketone, ethylidene acetone, alkyl acetone, mesityl oxide, phorone, ketene and its alkyl derivatives (aldoketenes and ketoketenes), the enol acetates derivable from ketene and alkyl ketenes by the Degering-Gwynn reaction; furfural, ionone; unsaturated ethers such as vinyl ethyl ether, vinyl butyl ether, vinyl decyl ether, vinyl octadenyl ether, vinyl phenyl ether, vinyl xylyl ethers, coumarone, etc.; polymers of homopolymerizable or copolymerizable hydrocarbons and/or oxygen-containing hydrocarbon monomers such as polymers of many of the compounds listed above, e.g. polymers of propylene, butylene, isobutylene, ethylene, hexene-1, acrylic acid and methacrylic acid and esters thereof, styrene, alkyl alcohol, vinyl ethyl ether, etc., including propylene tetramer, $C_7$ butylene-propylene codimer, polymethylmethacrylate, etc., and the like. The pentaerythritol di(dithiophosphoric acid) formed by reacting $P_2S_5$ with pentaerythritol as disclosed above is reacted with any of the olefinic compounds, for example, to form the addition agents of this invention. The olefinic compound may be selected by those skilled in the art to provide the desired R and R' groups in the addition agent; the addition of the olefinic compound to the pentaerythritol di(dithiophosphoric acid) being at the sulfur which is bonded by one bond to the phosphorus; the olefinic double adds at each such sulfur.

As a typical preparation of an addition agent of this invention, in a 3-liter, 3-necked flask fitted with a stirrer, a thermometer and reflux condenser, 68 grams (0.5 mol) of pentaerythritol and 111 grams (0.15 mol) of $P_2S_5$ were mixed with 500 ml. of dioxane solvent. The mixture was stirred and heated at reflux for two hours. During the heating period, the solids dissolved resulting in a clear yellow solution. 56 grams (0.5 mol) of diisobutylene were added, followed by 66 grams (0.5 mol) of dicyclopentadiene. The resulting clear solution was refluxed for two hours and 200 ml. of toluene were then added; the mixture was permitted to cool to room temperature. Thereafter, the product was washed with an equal volume of water followed by washing with an equal volume of saturated aqueous solution of sodium bicarbonate. A small amount of ether (200–400 ml.) was then added to aid separation of layers. The organic layer was recovered from the aqueous wash liquid and was air-blown to remove solvent. The yield was 295 grams (theoretical was 284 grams). A small portion of the product was washed several times with water to yield a light yellow solid. The solid was analyzed for phosphorus and found to contain 10.72% P (calculated 10.9%). An acetone solution of the solid was prepared for use in the engine tests for obtaining research and motor octanes below.

The addition agents of this invention are useful in appreciably suppressing surface ignition and may also be effective in reducing octane requirement increase and spark plug fouling. These effects are well known for phosphorus used in the form of phosphates in leaded fuels.

Additionally, the addition agents of this invention are thermally stable under high temperature operating conditions occurring in operating internal combustion engines. Although we do not wish to be held to any theory regarding thermal stability, it is believed that the reason for the property of thermal stability in the present addition agents is due to the absence of β hydrogens in the alkoxy portion of the additive. Accordingly, the β hydrogens in the alkoxy portion of thiophosphates are believed to tie up the sulfur atom which is double bonded to the phosphorus; the tying up of the sulfur is believed to be by way of a ring mechanism forming a bridge from the β hydrogen position to the sulfur atom. The present compounds have no β hydrogens and are therefore thermally stable. This property is manifested by a practically non-existent AKD, i.e., the virtual absence of adverse effects of the present thiophosphorus compounds on the anti-knock properties of the organo lead anti-knock agent.

In further illustration of the use of the present compounds as motor fuel addition agents, the addition agent prepared from the reaction of $P_2S_5$, pentaerythritol and diisobutylene and dicyclopentadienes as set out in the typical preparation above, was added in an amount providing .02% of theory based on lead to gasoline containing 3 cc. tetraethyllead per gallon. The resulting gasoline composition (Gasoline A) and a control composition containing none of the addition agent of this invention were tested for research and motor octanes in accordance with ASTM Research Method D–908–56 and ASTM Motor Method D–357–56 with the results reported in Table I, below:

*Table I*

| Run No. | Fuel Identities | Octane Numbers | |
|---|---|---|---|
| | | Research (RON) | Motor (MON) |
| 1+3 | Control | 98.7(¹) | 88.25(¹) |
| 2+4 | Gasoline A | 98.65(¹) | 88.3(¹) |
| | ΔRON | −.05 | |
| | ΔMON | | +.05 |

Average Octane No. $= \frac{\Delta RON + \Delta MON}{2} = \frac{(-.05)+(.05)}{2} = 0$ From the above data, it was determined, as above, that the average change in octane number, i.e. RON and MON, was zero. Thus, the surface ignition suppressors of this invention did not adversely affect the anti-knock properties of the TEL anti-knock agent.

It is evident from the foregoing that we have provided new and useful leaded motor fuel compositions containing thiophosphorus addition agents capable of suppressing surface ignition without materially adversely affecting the anti-knock action of the organo lead anti-knock agent.

We claim:

1. A hydrocarbon motor fuel of the gasoline boiling range adapted for spark ignition, internal combustion engines containing an effective anti-knock amount of tetraethyl lead and in combination therewith, in an amount sufficient to give a mol ratio of phosphorus to lead in the range of from about 0.001:1 to about 1:1, a dithiophosphate having the following general formula:

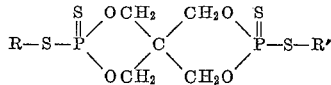

wherein R and R' are each radicals having from 2 to about 35 carbon atoms and are selected from the class consisting of hydrocarbon radicals, oxygen-containing hydrocarbon radicals, and mixtures thereof.

2. The composition of claim 1 wherein R is diisobutyl and R' is cyclopentadienecyclopentene.

3. The motor fuel of claim 1 wherein said mol ratio is from about 0.01 to about 0.3 mols phosphorus:lead.

4. Hydrocarbon motor fuel distilling in the gasoline distillation range and adapted for spark ignition-internal combustion engines containing from about 0.5 to about 5.0 ml. of tetraethyl lead per gallon of said motor fuel and an amount of O,O-dithiophosphato-S-diisobutyl O,O - dithiophosphato - S - cyclopentadienylcyclopentenyl pentaerythritol sufficient to give a mol ratio of phosphorus to lead in the range of from about 0.01 to about 0.3.

5. An additive for use in hydrocarbon fuels of the gasoline boiling range and adapted for use as a fuel in spark ignition internal combustion engines, said additive consisting essentially of tetraethyl lead and a dithiophosphate having the general formula:

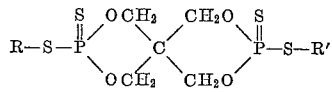

wherein R and R' are each radicals having from 2 to about 35 carbon atoms and are selected from the class consisting of hydrocarbon radicals, oxygen-containing hydrocarbon radicals, and mixtures thereof.

References Cited in the file of this patent

UNITED STATES PATENTS

| | | |
|---|---|---|
| 2,794,719 | Bartleson | June 4, 1957 |
| 2,847,443 | Hechenbleikner et al. | Aug. 12, 1958 |
| 2,999,739 | Heron | Sept. 12, 1961 |

OTHER REFERENCES

J. Amer. Chem. Soc., vol. 77, May 20, 1955, "The Synthesis of Monovinyl Esters of Phosphorus (V) Acids," Allen et al., page 2875 (entire article, pp. 2871–2875). Copy can be found 260–461.303.